June 10, 1952 S. E. NOYES Re. 23,511

STRESS BREAKER

Original Filed April 15, 1948

STANLEY E. NOYES,
INVENTOR.

BY Hleavin White

ATTORNEY.

Reissued June 10, 1952

Re. 23,511

UNITED STATES PATENT OFFICE 23,511

STRESS BREAKER

Stanley E. Noyes, Glendale, Calif., assignor to Dental Perfection Company, Glendale, Calif., a corporation of California Original No. 2,571,931, dated October 16, 1951, Serial No. 21,297, April 15, 1948. Application for reissue March 1, 1952, Serial No. 274,455

8 Claims. (Cl. 32—5)

Matter enclosed in heavy brackets [ ] appears in the original patent but forms no part of this reissue specification; matter printed in italics indicates the additions made by reissue.

This invention relates to a shock absorber positioned between an artificial tooth and an abutment tooth or natural tooth and the novel method of producing and assembling the same.

When artificial teeth in the form of partial bridges and the like are directly attached or clasped to natural abutment teeth soreness is apt to develop around the abutment teeth. Furthermore, due to the rigidity of the clasp or other attachment stresses and strains are imposed upon the abutment tooth which may result in this tooth becoming loose. The resulting looseness may even proceed to a point where it becomes necessary to remove the abutment tooth.

I have discovered a novel means of making a stress relieving device which may be interposed between the abutment tooth and the artificial tooth which results in lowering the stress and strain normally imposed on the abutment tooth to a point where the soreness, described above, is greatly relieved or eliminated and the danger of loosening the abutment tooth by the strain set up by the ordinary rigidly affixed artificial tooth is greatly lessened.

*My primary object is to incorporate a pre-assembled stress breaking attachment in a recess contained in the non-metallic body of an artificial tooth, all in a manner such as to reduce the required parts to the attachment and the recessed tooth, while affording all the stress breaking advantages of the more elaborate and expensive expedients heretofore considered necessary to give comparable results. Briefly, the invention contemplates the pre-assembled combination, which may be furnished to the dentist as such, of a connector member attachable to an abutment natural tooth, which is movably secured to the artificial tooth within its side recess, so that the artificial tooth when attached in the wearer's mouth has capacity for movement toward and away from the gum tissue, but with movement of the tooth away from the tissue positively blocked at a position of pre-determined alineability with the crown of the abutment tooth. Particularly the invention contemplates positioning the recess in the non-metallic body of the artificial tooth at a location toward the crown away from the tapered root portion of the tooth, so that the recess and the connector parts are more directly accessible to the dentist installing or adjusting the device.*

*Preferably contemplated is the employment of a pivotal attachment between the connector member or link and the body of the tooth within the recess, so that the artificial tooth is supported*

*for swinging movement toward and away from the gum tissue. By the simple expedient of engaging the connector member against a wall of the recess, blocking of the tooth movement away from the gum tissue is positively assured.*

Figure 1:
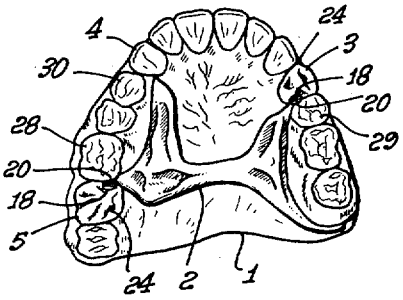

Referring to the drawings, Figure 1 represents a full set of teeth 1 in which a partial bridge 2 is inserted and held in place by mechanisms attached to the abutment teeth 3, 4 and 5, which will be more fully described later on in the specification.

Figure 2:
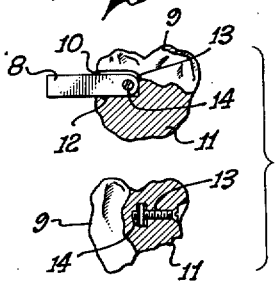

Figure 2 represents the method by which the shank or member to which the male member of the shock breaker is attached to the artificial tooth. In this figure 9 represents the chewing surface of an artificial tooth. Numeral 11 represents the lower side of the tooth.

In this figure the opening 13 is made in the artificial tooth by any suitable means such as cutting, or boring and in the event the tooth is constructed of thermoplastic resin this opening can be made by means of a heated piece of metal.

Into the opening 13 there is inserted the member 8 to which there will be attached the male member of the shock breaker which will be described later on. This member 8 is attached to the artificial tooth by means of the screw 14. This tooth moves about the screw 14 and it will be noted that member 8 lies against the surface 12 of opening 13 and that there is considerable clearance between the member 8 and the surface 10 of opening 13.

The lower view of Figure 2 shows an end view of the opening 13 into which fits the member 8, the screw hole 14 and the upper and lower ends of the tooth 9 and 11, respectively.

Figure 3:
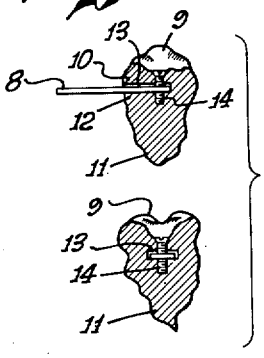

Figure 3 represents another method of inserting the member 8 to the artificial tooth. In this figure the member 8 has been inserted into the artificial tooth at a right angle to member 8 of Figure 2. In Figure 3 the flat or widest surface of member 8 is parallel to the surface 9, whereas, in Figure 2 the flat or widest surface of member 8 is at right angles to the surface 9. In Figure 3 it will be noted that the screw hole for attaching member 8 to the artificial tooth is made from the surface 9. After member 8 has been secured in place by the screw the latter is covered over with plastic and therefore is not visible. Where thermoplastic material has been employed to make the artificial tooth no difficulty is encountered in this operation since the screw top is merely covered by heating a portion of thermoplastic resin positioned on the screw top.

It will be noted in Figure 3 that the member 8 lies against the lower wall 12 of the opening 13 and that there is a space between the member 8 and the upper wall 10 of the opening 13.

The lower view of Figure 3 shows the upper and lower surfaces of the artificial tooth with the opening 13 for member 8 and the opening 14 for the screw to secure the member 8.

Figure 4:
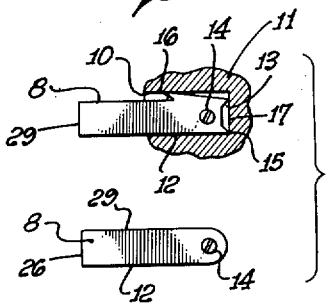

Figure 4 represents the means or method of attaching the member 8 to the artificial tooth in the opening 13. It will be noted that member 8 is provided with a protrusion 16. As member 8 is inserted into opening 13 this protrusion forces the lower surface of the member against the wall 12 of the opening 13 before the forward end of member 8 contacts wall 17 of the opening 13.

Another means of accomplishing the same result is as follows: The opening 13 (Figs. 2, 3 and 4) is made in the form of a wedge. In other words, the bottom or the forward wall 13 is narrower than the initial opening 13 into the artificial tooth. Likewise, the member 8 is wedge shaped in such a manner that as it (member 8) is introduced into the opening 13 the walls of member 8 will come in contact with the walls 10 and 12 of opening 13 before the forward end of 8 comes in contact with wall 17 of the opening 13.

Another modification consists in constructing member 8 with a lower surface parallel to wall 12 of opening 13, and with an upper wall sloping downwardly towards the screw 14 in such a manner that when member 8 is inserted into opening 13 the lower surface of member 8 contacts the wall 12 of opening 13 before the forward end of member 8 contacts the bottom 17 of opening 13. Another modification of this form is to cut the opening 13 in the artificial tooth in the form of a wedge with the two walls of this opening 10 and 12 converging toward its bottom wall 17. In this modification the member 8 is also constructed in the form of a wedge with its walls 12 and 29 (see Figure 4) converging towards the screw end 14. The size of this wedge is such that when it is inserted in the wedge shaped opening 13 the walls 12 and 29 of the member 8 contact the walls of the opening 13 before the forward end of member 8 contacts the bottom wall 17 of this opening. At this point the screw hole 14 is located, after which the wedge shaped member 8 is withdrawn and its upper side 29 is ground off or cut away so that when it is re-inserted in opening 13 and secured by a screw through opening 14 there will be a clearance between the wall 10 of the opening 13 and side 29 of wedge member 8.

In the three preceding methods which have been described for securing member 8 to the artificial tooth it will be noted that in the case of the method described in conjunction with Figure 4 the protrusion 16 on member 8 forces the lower side of this member against wall 12 of hole 13 before the forward end of member 8 contacts wall 17 of the opening 13. The sharp points on the forward end of member 8 tend to hold this member in place against the wall 12. These points force their way into the forward wall 17 of opening 13 as member 8 is introduced into this opening.

When member 8 has been introduced into opening 13 and the lower side of 8 is firmly against the wall 12 together with the sharp forward points of member 8 extending into the material of wall 13 the screw is inserted in hole 14 of member 8 securing this member to the tooth. This screw is then removed, member 8 is withdrawn from opening 13 and the points on the forward end of member 8 and protrusion 16 are removed, as shown in the lower view of Figure 4. The points on the forward end of member 8 and the protrusion 16 may be removed from member 8 either by grinding or cutting. After removal of these points and protrusion 16, member 8 is then replaced in opening 13 and secured to the artificial tooth by means of screw 14.

Where the opening in the artificial tooth is wedge shaped and member 8 is also in the form of a wedge, as previously described, the following technique is employed in fixing member 8 to the artificial tooth. The wedge shaped member 8 is introduced or forced into the wedge shaped opening 13. At this point in the procedure the upper and lower walls of member 8 are in contact with walls 10 and 12 of opening 13 (see Figures 2 and 4). The forward end of wedge shaped member 8, however, is not in contact with the forward wall or bottom of opening 13.

While member 8 is in the position just previously described the screw 14 is introduced securing member 8 rigidly to the artificial tooth. The screw 14 is then removed and member 8 is withdrawn from opening 13. After removal of member 8 from opening 13 its upper wall and forward end are ground off so that when this member is re-inserted in opening 13 and secured to the artificial tooth the lower side of member 8 will still be in contact with wall 12 of opening 13 and the forward end and upper side of member 8 will be some distance from the forward end 17 of the opening 13 and its upper wall 10. Member 8 will then appear in the form shown on the lower view of Figure 4.

In the case of the third modification where the opening 13 is rectangular in form and the lower side of member 8 is parallel to wall 12 of opening 13 and the upper side of member 8 slopes downward toward the screw hole opening 14 the following method is employed to secure member 8 to the artificial tooth. Member 8 is forced into the opening 13 until the upper and lower walls of 8 are in contact with walls 10 and 12 of opening 13. At this point in the procedure the forward end of 8 is short of contact with wall 17 (see Figure 4). The screw is then inserted in hole 14. The place for the screw hole then becomes a determined point or place.

The screw in hole 14 is then removed, member 8 is taken from the opening 13 and the upper side of member 8 is ground off so that when this member is re-inserted in opening 13 and secured by inserting a screw in opening 14 there will be a substantial clearance or distance between the upper side of member 8 and the wall 10 of opening 13 (Figures 2 or 4).

Figure 5:
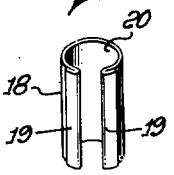
Figure 6:
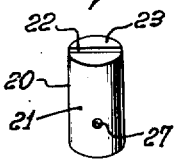

As has been pointed out above, the end 26 supports the male fitting shown in Figure 6 or as an alternative a clasp which fits over the anchor tooth (see Figures 1, 3, 4 or 5). When a clasp is employed instead of the male member shown in Figure 6 a vertical member is soldered or secured to the end 26 of member 8 (Figure 4), and the clasp is then soldered or secured to this vertical member.

Figure 5 represents a female member to receive the male member shown in Figure 6. The female member is fitted into a recess or chamber made into the crowned anchor tooth. (See Figure 7, numeral 3 or Figure 1, numerals 3 or 5.) This female member shown in Figure 5 is cylindrical in form provided with the two seams or members 19 to secure it to the recess or chamber of the crowned anchor tooth.

The male member shown in Figure 6 is constructed of three parts, namely, parts 21 and 23 placed on the outside of the flat member 22; all three members, 21, 22 and 23, being held together by a pin or rivet 27 placed through these three parts, as shown in Figure 6. This rivet permits the integral parts of the male member 20 (Figure 6) to spread slightly thus providing a binding effect when this male member is inserted into the female filling 18 of Figure 5.

Figure 7:
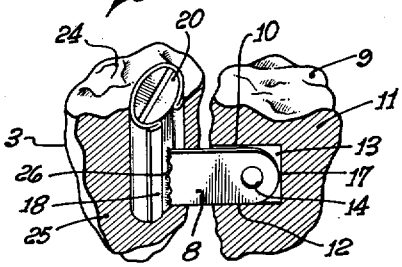

Figure 7 shows one form of the completed assembly comprising the anchor tooth 3 with its crown 24 and provided with the female member 18; the artificial tooth with its opening 13 and containing member 8 secured thereto by a screw inserted in opening 14 in such a manner that the lower edge of member 8 is in contact with wall 12 of opening 13; the forward end of member 8 is out of contact with wall 17 of opening 13, and the upper edge of member 8 is spaced from wall 10 of opening 13 and a screw is secured in opening 14.

In the practice of the invention the following procedure is employed. First the anchor tooth 3 (Figure 7) is crowned, recessed and provided with the female member 18. Member 8 is next inserted into the artificial tooth, as has been previously described in conjunction with Figures 2, 3 and 4. The male member 20 (Figure 6) is then inserted into the female member 18 (Figure 7). The artificial tooth is then placed in its normal position in the mouth contiguous to the anchor tooth 3 and the end 26 of member 8 is cut off to a proper length so that when the end 26 is butted against male member 20 and normal distance exists between the artificial tooth 9 and the anchor tooth 3. With the artificial tooth resting in a normal position in the patient's mouth and with member 8 butting against the male member 20, member 8 is securely affixed to male member 20 by means of wax.

The artificial tooth 9 with member 8 affixed to male member 20 by means of wax is then removed from the patient's mouth and member 8 is soldered to male member 20.

Where clasps are employed instead of the male and female members the procedure is as follows. The clasp is placed around the anchor tooth 3, which in this case does not require a crown. The artificial tooth is placed in the patient's mouth contiguous to the anchor tooth in the normal position and the vertical bar attached to member 8 which is butted against the clasp (around the anchor tooth) is securely waxed thereto. The artificial tooth with member 8 affixed thereto and the latter securely waxed to the clasp are removed from the patient's mouth. The clasp is soldered to the vertical member attached to member 8 and any excess of the vertical member above the clasp is cut off. The clasp with the attached artificial tooth is now ready for a permanent position in the mouth.

In Figure 1 anchor teeth 3 and 5 are fitted with female structures, as is shown in Figures 5 and 6. Furthermore, in this figure artificial teeth 28 and 29 are fitted with the male member 20, shown in Figure 6, and attached to the artificial teeth 28 and 29 by means of a member 8 and a screw inserted in hole 14, as shown in the Figures 2, 3, 4 and 7.

Furthermore, anchor tooth 4 in Figure 2 is fitted with a clasp attached to artificial tooth 30 by means of a member 8 fitted with a vertical bar, as described above. Therefore, it will be seen that Figure 7 represents an anchor tooth 3 to which there is attached through the stress breaker a single artificial tooth 9 to which any number of other artificial teeth may be attached as in the case of Figure 1.

I claim:

1. An artificial tooth having an opening in the side wall thereof intermediate the crown and base of said tooth, a link member secured in said opening by means of a pin in such manner that the lower side of said link lies against the lower wall of said opening and the upper side and end of said link adjacent said pin are spaced from the upper and end walls of said opening, and a fastening member secured to the free end of said link member, said link member being movable about said pin in said side wall opening of the artificial tooth.

2. An artificial tooth having an opening in the side wall thereof intermediate the crown and base of said tooth, the upper and lower walls of said opening being substantially parallel to the top of the said artificial tooth crown, a link member secured in said opening by means of a pin passing at right angles to the opening in said tooth through one of the walls of said opening and through said link, said link member being secured in said opening by said pin in such manner that the lower side of said link lies against the lower wall of said opening and the upper side and end of said link adjacent said pin are spaced from the upper and end walls of said opening, and a fastening member secured to the free end of said link member, said link member being movable about said pin in said side wall opening of the artificial tooth.

3. An artificial tooth having an opening in the side wall thereof intermediate the crown and base of said tooth, the upper and lower walls of said opening being substantially parallel to the top of said artificial tooth crown, a link member secured in said opening by means of a pin passing at right angles to said opening and the principal axis of said tooth through one of the walls of said opening and through said link, said link member being secured in said opening by said pin in such a manner that the lower side of said link lies against the lower wall of said opening and the upper side and end of said link adjacent said pin are spaced from the upper and end walls of said opening, said link member being movable about said pin within the side wall opening in said artificial tooth and a fastening member secured to the free end of said link member.

*4. The combination comprising an artificial tooth having a non-metallic body containing a side recess to be positioned adjacent a natural abutment tooth, and a stress breaker attachment contained in said recess and comprising a member projecting out of the recess and connectible to the abutment tooth, means in said recess movably attaching the artificial tooth to said member so that when connected by the member to the abutment tooth the artificial tooth is movable vertically toward and away from the gum tissue of the wearer, and means in said recess positively blocking movement of the artificial tooth at a predetermined point away from the gum tissue.*

*5. The combination comprising an artificial tooth having a non-metallic body containing a side recess to be positioned adjacent a natural abutment tooth, and a stress breaker attachment contained in said recess and comprising a member projecting out of the recess and connectible to the abutment tooth, means in said recess movably attaching the artificial tooth to said member so that when connected by the mem-*

*ber to the abutment tooth the artificial tooth is movable vertically toward and away from the gum tissue of the wearer, said member being engageable against the wall of said recess to positively block movement of the artificial tooth at a predetermined point away from the gum tissue.*

*6. The combination comprising an artificial tooth having a non-metallic body containing a side recess to be positioned adjacent a natural abutment tooth, and a stress breaker attachment contained in said recess and comprising a member projecting out of the recess and connectible to the abutment tooth, means in said recess pivotally attaching the artificial tooth to said member for movement about an axis in a plane transverse to the longitudinal axis of the tooth so that when connected by the member to the abutment tooth the artificial tooth is movable vertically and pivotally toward and away from the gum tissue of the wearer, and means in said recess positively blocking pivotal movement of the artificial tooth at a predetermined point away from the gum tissue.*

*7. The combination comprising an artificial tooth having a non-metallic body containing a side recess to be positioned adjacent a natural abutment tooth, and a stress breaker attachment contained in said recess and comprising a member projecting out of the recess and connectible to the abutment tooth, means in said recess pivotally attaching the artificial tooth to said member for movement about an axis in a plane transverse to the longitudinal axis of the tooth so that when connected by the member to the abutment tooth the artificial tooth is movable vertically and pivotally toward and away from the gum tissue of the wearer, said member being engageable against the wall of said recess to positively block pivotal movement of the artificial tooth at a predetermined point away from the gum tissue.*

*8. The combination comprising an artificial tooth having a non-metallic body downwardly convergent toward its root from an intermediate portion of larger transverse dimension, said intermediate portion containing above the root a recess closed at its upper and lower ends and adapted to be positioned adjacent a natural abutment tooth, and a stress breaker attachment contained in said recess and comprising a member projecting out of the recess and connectible to the abutment tooth, means in said recess movably attaching the artificial tooth to said member so that when connected by the member to the abutment tooth the artificial tooth is movable vertically toward and away from the gum tissue of the wearer, and means in said recess positively blocking movement of the artificial tooth at a predetermined point away from the gum tissue.*

STANLEY E. NOYES.

REFERENCES CITED

The following references are of record in the file of this patent or the original patent:

UNITED STATES PATENTS

| Number | Name | Date |
|---|---|---|
| 542,138 | Bray | July 2, 1895 |
| 1,614,325 | Stoeffler | Jan. 11, 1927 |
| 1,953,715 | Joffe | Apr. 3, 1934 |